United States Patent
Sun

(10) Patent No.: US 7,054,536 B2
(45) Date of Patent: May 30, 2006

(54) BREAKOUT ASSEMBLY FOR FLEXIBLE CIRCUITRY

(75) Inventor: Maurice X. Sun, Naperville, IL (US)

(73) Assignee: Molex Incorporated, Lisle, IL (US)

( * ) Notice: Subject to any disclaimer, the term of this patent is extended or adjusted under 35 U.S.C. 154(b) by 84 days.

(21) Appl. No.: 10/844,157

(22) Filed: May 12, 2004

(65) Prior Publication Data

US 2005/0254755 A1 Nov. 17, 2005

(51) Int. Cl.
*G02B 6/00* (2006.01)

(52) U.S. Cl. .................. 385/137; 385/136; 385/114

(58) Field of Classification Search .............. 385/53, 385/114, 59, 60, 139, 137, 136
See application file for complete search history.

(56) References Cited

U.S. PATENT DOCUMENTS

| | | | | |
|---|---|---|---|---|
| 4,648,168 A | * | 3/1987 | Nolf et al. ................ | 385/135 |
| 5,659,655 A | * | 8/1997 | Pilatos ..................... | 385/136 |
| RE36,592 E | | 2/2000 | Giebel et al. ............. | 385/100 |
| RE37,028 E | | 1/2001 | Cooke et al. ............. | 385/112 |
| 6,381,397 B1 | | 4/2002 | Bevan et al. ............. | 385/139 |
| 6,434,307 B1 | * | 8/2002 | Church .................... | 385/114 |
| 6,434,316 B1 | * | 8/2002 | Grois et al. .............. | 385/139 |
| 6,480,654 B1 | * | 11/2002 | Church .................... | 385/114 |
| 6,614,971 B1 | * | 9/2003 | Sun et al. ................. | 385/114 |
| 6,636,673 B1 | * | 10/2003 | Register et al. .......... | 385/105 |

\* cited by examiner

*Primary Examiner*—Brian M. Healy
(74) *Attorney, Agent, or Firm*—Romi N. Bose

(57) ABSTRACT

A lightweight flexible breakout device supports a plurality of single optical fibers, a portion of which are ribbonized. The breakout device generally includes a sleeve having a passageway therethrough and an input holder and an output holder positioned within the passageway. The input holder supports the ribbonized portion of the fibers and the output holder supports the plurality of single optical fibers. Each single optical fiber extends through a fiber jacket that is supported by the output holder. A sealant is provided within the housing between the input holder and the output holder and provides support for the fibers within the passageway of the sleeve.

21 Claims, 2 Drawing Sheets

BREAKOUT ASSEMBLY FOR FLEXIBLE CIRCUITRY

FIELD OF THE INVENTION

This invention is generally directed to a breakout assembly that is used to separate a fiber ribbon into single fibers for termination.

BACKGROUND OF THE INVENTION

Flexible circuitry products have been increasingly used in daughter card assemblies. Flexible circuitry products are typically machine made with 250 micrometer diameter bare fiber on the substrate and ribbonized input and output fibers extending beyond the substrate. In some cases, single fiber connectors are required. Therefore, the ribbonized optical fibers must be separated into the single optical fibers. Thus, a transition area is provided in which the ribbonized optical fibers are separated or broken out to provide single optical fibers that are then terminated. Use of single optical fibers requires tubing to protect and strengthen the single optical fibers. Although breakout devices have been used to protect the fibers in the transition area, these devices are generally bulky and complicated.

The breakout devices currently used are made from hard plastic and screws are used to mount the breakout device to the motherboard or daughter card of the system. As a result, a relatively large space is needed to mount the breakout devices.

Accordingly, a need exists for a simple breakout device that requires a relatively small amount of space.

OBJECTS AND SUMMARY OF THE INVENTION

A general object of the present invention is to provide a breakout device with relatively small dimensions.

An object of the present invention is to provide a flexible breakout device.

Another object of the present invention is to provide a breakout device that can be easily manufactured.

A further object of the present invention to provide a breakout device that can be mounted using standard electrical wire supports.

Briefly, and in accordance with the foregoing, the present invention discloses a breakout device whose dimensions are nominally larger than the dimensions of the ribbonized optical fibers. The breakout device is light weight and therefore it is not necessary to mount the breakout device to the substrate on which the ribbonized fiber is provided. The breakout device is flexible allowing it to be mounted in relatively tight spaces. Finally, the breakout device is assembled in a simple manner.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENTS

Figure 1:
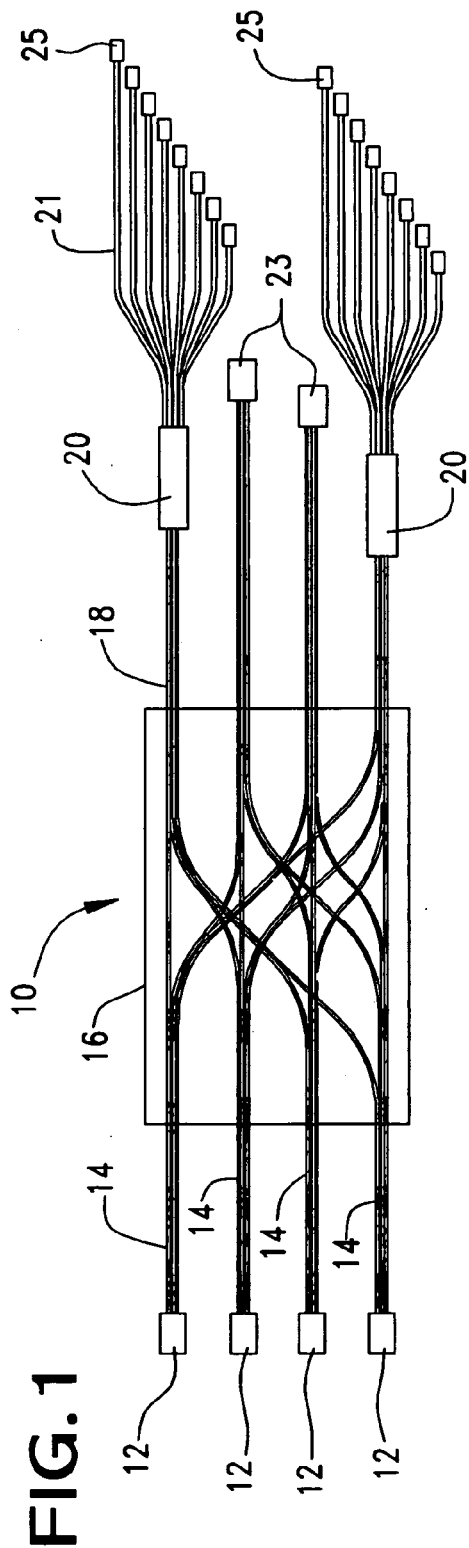
FIG. 1 is a schematic that represents a flexible circuitry including the breakout device that incorporates the features of the present invention.

While the invention may be susceptible to embodiment in different forms, there is shown in the drawings, and herein will be described in detail, specific embodiment with the understanding that the present disclosure is to be considered an exemplification of the principles of the invention, and is not intended to limit the invention to that as illustrated and described herein.

FIG. 1 shows flexible optical circuitry 10. The circuitry 10 includes multi-fiber connectors 12, and a fiber optic input ribbon 14 extending from the respective multi-fiber connector 12. Each input ribbon 14 is comprised of a plurality of single optical fibers. The input ribbons 14 are provided to a fiber shuffle zone 16. Within the fiber shuffle zone 16, the single fibers of each input ribbon 14 are combined with single fibers of other input ribbons 14 to form fiber optic output ribbons 18. Each output ribbon 18 is formed from a plurality of single optical fibers. As shown, four multi-fiber connectors 12 are provided along with four fiber optic input ribbons 14. It is to be understood that more or fewer multi-fiber connectors 12 and input ribbons 14 can be used in accordance with the specifics of the circuitry to be provided. The multi-fiber connectors 12, input ribbons 14, fiber shuffle zone 16, and output ribbons 18 are conventional.

A breakout device 20 or, alternatively, a terminating connector 23 is provided on each output ribbon. Jacketed single fibers 21 extend from each of the breakout devices 20 and are terminated with a single fiber connector 25. The terminating connectors 23, jacketed single fibers 21 and single fiber connectors 25 are conventional.

Figure 2:
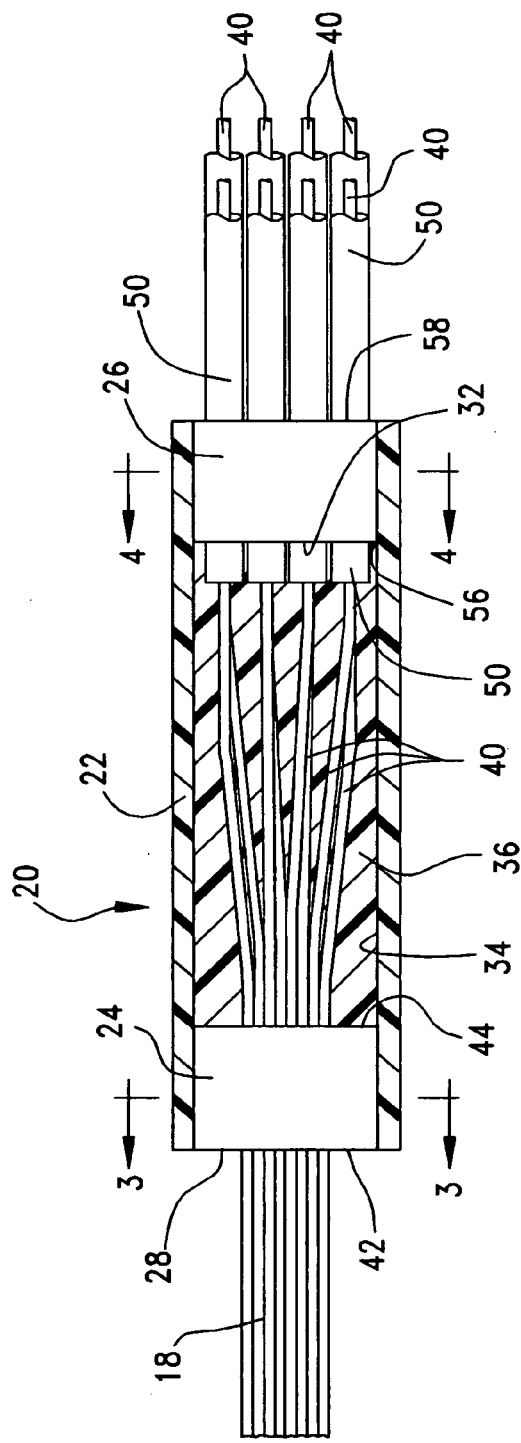
FIG. 2 is a cross-sectional view of the breakout device of the present invention and showing a fiber ribbon that is separated into single fibers.

As shown in FIG. 2, the breakout device 20 generally includes a flexible sleeve 22, a input holder 24, and an output holder 26. An input end 28 of the breakout device 20 receives the output ribbon 18 from the fiber shuffle zone 16 and the jacketed single fibers 21 extend from the output end 32 of the breakout device 20.

The flexible sleeve 22 is elongated and tubular-shaped. The flexible sleeve 22 may be formed using one or more of a variety of materials. For example, suitable material includes flexible fiberglass sleeving such as Varglas Non-Fray Sleeving available from Varflex Corporation of Rome New York. Other materials may be used as well. Referring to FIG. 2, a central passageway 34 is provided through the flexible sleeve 22. A silicone adhesive sealant 36 is provided in the central passageway 34 between the input holder 24 and the output holder 26. The sealant 36 provides stability to the fibers 40 within the central passageway 34.

Figure 3:
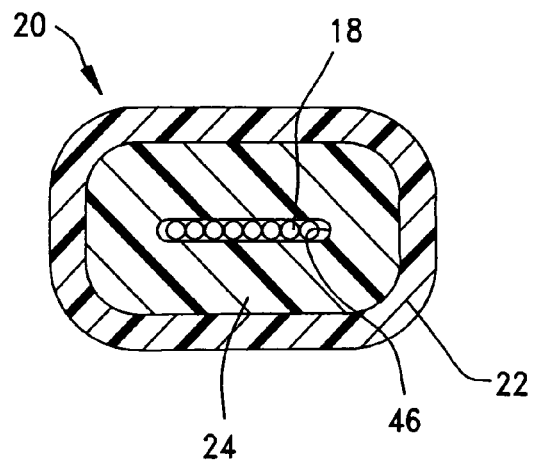
FIG. 3 is a cross-sectional view of the breakout device along line 3—3 of FIG. 2.

The input holder 24 is positioned proximate the input end 28 of the breakout device 20. The input holder 24 has an inner end 42 and an outer end 44. Preferably, the input holder 24 is formed from molded rubber. FIG. 3 illustrates an exemplary embodiment of the input holder 24. Although shown generally as elongated and rectangular shaped with rounded corners, the input holder 24 may take on a variety of different form factors as desired. The input holder 24 is positioned within the flexible sleeve passageway 34. A centrally located fiber ribbon passageway 46 is provided through the input holder 24 and extends from the inner end 42 to the outer end 44. The fiber ribbon passageway 46 is generally rectangular shaped to correspond to the shape of the ribbon cable. However, fiber ribbon passageway 46 may take on a variety of different shapes depending on the shape of the ribbon. The fiber ribbon passageway 46 is sized to allow the output ribbon 18 to pass through the fiber ribbon passageway 46. The input holder 24 provides support for the output ribbon 18 and prevents the output ribbon 18 from splitting. The input holder 24 also defines the shape of the flexible sleeve 22 at the input end 28 of the breakout device 20. The input holder 24 engages the inner surface of the flexible sleeve 22 such that the position of the input holder 24 relative to the flexible sleeve 22 is fixed.

The output ribbon 18 extends through the input holder 24. Proximate the inner end 44 of the input holder 24, the output ribbon 18 is broken out into a plurality of single fibers 40 that extend through the central passageway 34 of the sleeve 22.

Figure 4:
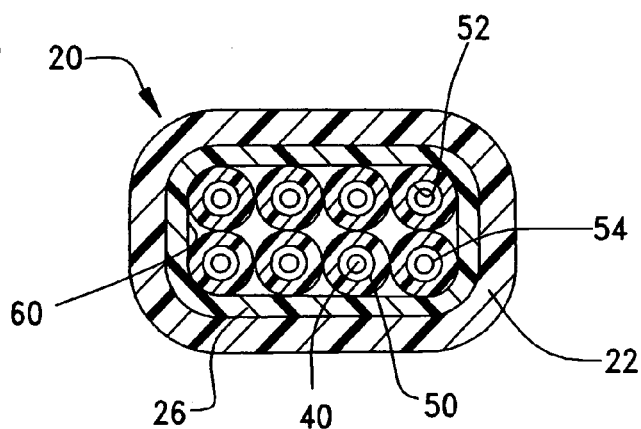
FIG. 4 is a cross-sectional view of the breakout device along line 4—4 of FIG. 2.

A cylindrically shaped jacket 50 is provided around each of the single fibers 40 proximate the output end 32 of the breakout device 20. Each jacket 50 has a single fiber passageway 52 extending therethrough that receives a single fiber 40. As shown in FIG. 4, the diameter of each single fiber passageway 52 is larger than the diameter of each single fiber 40. As a result, a gap 54 is provided between the fiber 40 and the jacket 50 allowing the jackets 50 to move freely along the length of the fibers 40. Preferably, the jackets 50 have an outside diameter of 900 micrometers and an inside diameter of 475 micrometers. Preferably, each jacket 50 is a different color and each colored tube is provided in a predetermined position.

The output holder 26 is positioned proximate the output end 32 of the breakout device 20 within the central passageway 34 of the sleeve 22. The output holder 26, which is preferably formed from a heat-shrink plastic, includes an inner end 56 and an outer end 58. As shown in FIG. 4, the output holder 26 has a generally rectangular cross-section with rounded corners. A centrally located passageway 60 is provided through the output holder 26 and extends from the inner end 56 to the outer end 58 of the output holder 26. The passageway 60 is sized to allow a plurality of jackets 50 to pass therethrough. The jackets 50 extend beyond the inner and outer ends 56, 58 of the output holder 26. The output holder 26 provides support for the jackets 50 along with the corresponding single fibers 40. The output holder 26 also defines the shape of the flexible sleeve 22 at the output end 32 of the breakout device 20. The output holder 26 engages the inner surface of the flexible sleeve 22 such that the position of the output holder 26 relative to the flexible sleeve 22 is fixed.

The process of forming the breakout assembly 20 will now be described. Before forming the breakout assembly 20, a portion of the fibers extending from the fiber shuffle zone 16 are ribbonized forming the output ribbons 18. The output ribbon 18 is then passed through the fiber ribbon passageway 46, the input holder 24 such that input holder 24 is positioned around the ribbonized portion of the output ribbon 18. The jackets 50 are then cut to a predetermined length and each single fiber 40 is then placed within a jacket 50. The jackets 50 are passed through the passageway 60 of the output holder 26. Because the inner diameters of the jackets 50 are larger that the diameter of the single fibers 40, the jackets 50 can be moved along the length of the single fibers 40. The output holder 26, along with the jackets 50 extending therethrough, is then positioned a predetermined distance from the input holder 24. Next, the sleeve 22 is slid over the jackets 50, over the output holder 26 and over the input holder 24, until the input end of the sleeve 22 is aligned with the outer end 42 of the input holder 24 and the output end of the sleeve 22 is aligned with the outer end 58 of the output holder 26. Heat is then applied to the sleeve 22 to shrink the sleeve 22 and secure the input holder 24 and the output holder 26 within the sleeve 22. A needle is used to puncture the sleeve 22 and the adhesive sealant 36 is injected into the central passageway 34 of the sleeve 22 to provide support for the single fibers 40 within the sleeve 22. After the sealant 36 has cured, connectors 25 are mounted to each of the free ends of the single fibers 40. Thus, the process of forming the breakout device 20 is relatively simple and inexpensive.

The breakout device 20 is lightweight and flexible. The sleeve 22 of the breakout device 20 is relatively thin and therefore the breakout device 20 is only nominally larger than the fiber ribbon 18 itself. As a result, the breakout device 20 can be used in areas of limited space.

Figure 5:
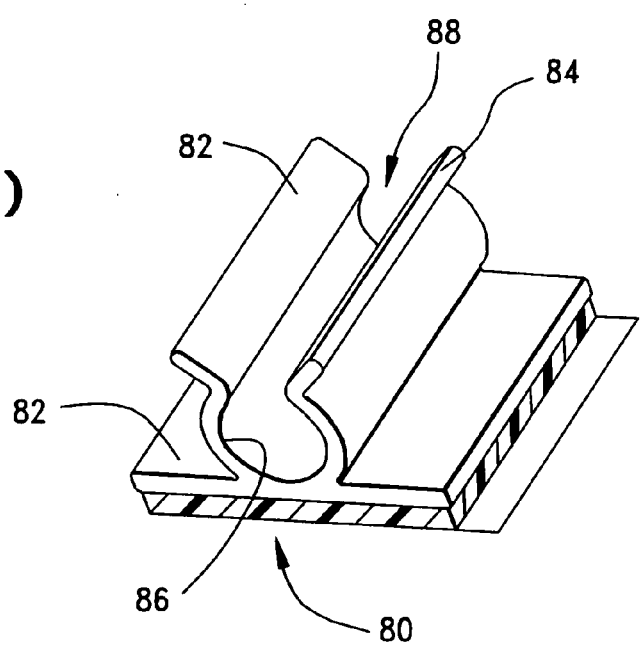
FIG. 5 is a perspective view of a prior art clip to be used in connection with the breakout device of the present invention.

The breakout device 20 can be easily mounted to a substrate by placing the breakout device within a clip mounted to the substrate. These clips can be mounted to the substrate, for example, by using adhesive tapes or by snap fitting the clips on the substrate. Examples of these clips include the stand-off harness clip sold by Richco Inc., part number SHK-1-12-01, or the type U clip sold by Richco, Inc., part number KKU-12-RT. Each of these clips is generally cylindrically-shaped with an elongated opening provided opposite the substrate for receiving a wire or cable. A variety of lengths are provided for each type of clip. A clip 80 sold by Richco, Inc. under the part number KKU-12-RT is shown in FIG. 5. The clip 80 includes a base 82 which mounts to a substrate and first and second upright arms 82, 84. The upright arms 82, 84 are positioned to form a generally cylindrically-shaped passageway 86. An elongated slot 88 provides access to the passageway 86. The breakout device 20 is mounted within the clip 80 by aligning the sleeve 22 with the slot 88 and then pressing downward on the sleeve 22 to cause the arms 82, 84 to flex outwardly. As the arms 82, 84 flex outwardly, the sleeve 22 moves into the passageway 86. Once the sleeve 22 is positioned within the passageway 86, the arms 82, 84 spring inwardly to secure the breakout assembly 20 on the board. Although the passageway 86 of the clip 80 has a generally round cross-section, the flexible nature of the breakout device 20 allows the breakout device 20 to generally conform to the passageway 86 of the clip 80. Therefore, standard clips, such as the clip 80, which are typically used to mount electrical wires and cables, can be used to attach the breakout device 20 to the substrate. It is not necessary to mount the breakout device 20 to the substrate to which the ribbonized fiber is attached. Because of its light weight, the breakout device 20 can be located off the substrate without creating stress on the ribbonized fiber attached to the substrate.

While a preferred embodiment of the present invention is shown and described, it is envisioned that those skilled in the art may devise various modifications of the present invention without departing from the spirit and scope of the appended claims.

What is claimed is:

1. A breakout device for supporting a plurality of single optical fibers, the breakout device comprising:
 a flexible sleeve having a central passageway extending therethrough;
 an input holder positioned within said sleeve having a passageway therethrough; and
 an output holder positioned within said sleeve having a passageway therethrough.

2. A breakout device as defined in claim 1, wherein said output holder is spaced from said input holder.

3. A breakout devices a defined in claim 1, wherein said sleeve includes an input end and an output end and said input holder is positioned proximate said input end and said output holder is positioned proximate said output end.

4. A breakout device as defined in claim 1, wherein said sleeve is formed from heat shrinkable plastic.

5. A breakout device as defined in claim 1 wherein said input holder is formed of rubber.

6. A breakout device as defined in claim 1, further including a plurality of fiber jackets, each jacket including a fiber passageway therethrough, wherein a portion of each of the single optical fibers is positioned within one of the plurality of fiber jackets.

7. A breakout device as defined in claim 1, wherein said output holder is formed from a flexible material.

8. A breakout device as defined in claim 7, wherein said output holder is formed from heat shrinkable plastic.

9. A breakout device as defined in claim 1, further comprising a sealant within said central passageway.

10. A breakout device as defined in claim 9, wherein said sealant is silicone.

11. A breakout device as defined in claim 1, wherein an inner diameter of each said fiber jacket is larger than an outer diameter of the respective single optical fibers.

12. A breakout devices as defined in claim 1, wherein the perimeter of said input holder is generally rectangular-shaped with rounded corners.

13. A breakout device as defined in claim 1, wherein the perimeter of said output holder is generally rectangular-shaped with rounded corners.

14. A breakout device as defined in claim 1, wherein the perimeter of said sleeve is generally rectangular-shaped with rounded corners.

15. A process of forming a breakout device comprising the steps of:
 providing a plurality of single optical fibers;
 ribbonizing a portion of said plurality of single optical fibers to form a ribbonized portion;
 providing an input holder including an input passageway therethrough;
 positioning said ribbonized portion within said input passageway;
 providing an output holder including an output passageway therethrough;
 positioning said single optical fibers through said output passageway;
 providing a sleeve;
 positioning said sleeve around said input holder and said output holder; and
 engaging said sleeve with said input holder and said output holder.

16. The method as defined in claim 15, further including the steps of:
 providing a plurality of fiber jackets;
 positioning a portion of each of said plurality of single optical fibers within one of said plurality of fiber jackets; and
 positioning each of said fiber jackets within said output passageway.

17. The method as defined in claim 15, wherein said sleeve is formed from heat shrinkable plastic and said step of engaging is performed by heating said sleeve.

18. The method as defined in claim 15, further including the step of injecting a sealant within said sleeve between said input holder and said output holder.

19. The method as defined in claim 15, wherein said output holder is formed from a heat shrinkable plastic and further comprising the step of applying heat to said output holder subsequent to the step of positioning said single optic fibers within said output passageway of said output holder.

20. The method as defined in claim 15, further including the step of providing a connector on a free end of each single optical fiber.

21. A breakout device comprising:
 a flexible sleeve having a central passageway therethrough;
 an input holder positioned within said central passageway of said sleeve, said input holder having a passageway therethrough;
 an output holder positioned within said central passageway of said sleeve, said output holder having a passageway therethrough; and
 a plurality of single optical fibers having a ribbonized portion, said ribbonized portion extending through said passageway of said input holder, said single optical fibers extending through said passageway of said output holder.

* * * * *